Patented Feb. 4, 1936

2,029,925

UNITED STATES PATENT OFFICE 2,029,925

CELLULOSE ORGANIC ESTER COMPOSITIONS CONTAINING A PROPIONYL ESTER OF GLYCEROL

David C. Hull, Kingsport, Tenn., assignor to Eastman Kodak Company, Rochester, N. Y., a corporation of New York No Drawing. Application April 10, 1933, Serial No. 665,335

10 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object is to produce compositions which can be molded at elevated temperatures and high pressures to produce plastic products having the desirable properties of celluloid. Other objects will become apparent to those skilled in the art to which this invention pertains.

While cellulose acetate has been known for decades, it has also been known that to utilize it in the various plastic arts it is necessary to mix therewith plasticizing or conditioning agents, such as triphenyl phosphate, monochloronaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

I have discovered that valuable properties may be induced in and/or contributed to compositions containing organic esters of cellulose, such as cellulose acetate, by adding thereto as a plasticizing compound a propionyl ester of glycerol containing less than three propionyl groups, such as glyceryl dipropionate, glyceryl dipropionate monoacetate, and glyceryl monopropionate diacetate. The particularly useful properties which these compounds induce in or contribute to cellulose organic ester compositions containing them are hereinafter enumerated.

Glyceryl dipropionate may be prepared by esterifying one mol of glycerol with two mols of propionic acid, using a small amount of sulfuric acid as a catalyst, and employing toluene or a similar hydrocarbon as a water-withdrawing agent. A toluene-water azeotrope is distilled over until the theoretical amount of water has been withdrawn. More toluene may be added to the esterification vessel if needed, or the toluene driven over may be returned to the esterification vessel after separation from the water. The ester formed is washed with sodium carbonate, dried, and distilled under vacuum.

Glyceryl dipropionate monoacetate may be prepared by esterifying glyceryl dipropionate with the theoretical amount of acetic acid, using a small amount of sulfuric acid as a catalyst and withdrawing the theoretical amount of water in the manner just described.

Glyceryl monopropionate diacetate may be prepared by esterifying one mol of glycerol with two mols of acetic acid in the manner described, and then esterifying the product with one mol of propionic acid, in the same manner.

The process of preparing these compounds is not my invention, but is the invention of William W. Hartman and Emil J. Rahrs.

While the compounds prepared as described may not be pure compounds, but may be mixtures of the various possible esters of glycerol with the organic acids used, the compound named in each case predominates.

In order that those skilled in this art may better understand my invention I would state, by way of illustration, that for the manufacture of photographic film or other sheets my new compositions of matter may be compounded as follows: 100 parts of acetone-soluble cellulose acetate, i. e. cellulose acetate containing from 36° to 42° acetyl radical, approximately, is dissolved with stirring at atmospheric temperature in 300 to 500 parts, preferably 400 parts, by weight, of acetone. To this solution may be added from 10 to 75 parts by weight of a propionyl ester of glycerol containing less than three propionyl groups, such as glyceryl dipropionate, glyceryl dipropionate monoaceate, or glyceryl monopropionate diacetate. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning no more readily than ordinary newsprint. Films or sheets produced in accordance with my invention are tough and flexible, and maintain flexibility in a superior fashion.

Other similar solvents (instead of acetone) which are compatible with the cellulose acetate and my new plasticizers will also occur to those skilled in this art, such as ethylene chloride-alcohol mixtures. In like manner my novel plasticizers may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate, cellulose aceto-tartrate or the like, a suitable solvent which will dissolve both the cellulosic derivative and the plasticizer being employed, such, for instance, as an alkylene chloride with or without the addition of alcohol.

My novel plasticizers may also be advantageously used as plasticizers in cellulose acetate molding compositions. For instance, when about 30% (30 parts by weight based on the cellulose acetate) of glyceryl dipropionate, glyceryl dipropionate monoacetate, or glyceryl monopropionate diacetate is homogeneously mixed with cellulose acetate, the mixture may be converted into a hard, transparent or translucent plastic product by molding at a temperature of 140–160° C. and 2500 to 4000 pounds per square inch for a period of from 2 to 5 minutes, in a manner already known to those skilled in molding compounds of that nature. Furthermore, my novel plasticizers are useful in the dry-molding processes described and claimed in the application of Fred R. Conklin entitled "Molding process", Serial No. 665,258, filed of even date herewith.

What I claim as my invention and desire to be secured by Letters Patent of the United States is:

1. A composition of matter comprising a cellulose organic acid ester and, as a plasticizer therefor, a compound selected from the group consisting of glycerol diproprionate and glycerol dipropionate monoacetate.

2. A composition of matter comprising a cellulose organic acid ester and glycerol dipropionate as a plasticizer therefor.

3. A composition of matter comprising a cellulose organic acid ester and glycerol dipropionate monoacetate as a plasticizer therefor.

4. A composition of matter comprising a cellulose organic acid ester and the product produced by esterifying one mol of glycerol with two mols of propionic acid, in which esterification product glyceryl dipropionate predominates.

5. A composition of matter comprising a cellulose organic acid ester and the product produced by esterifying one mol of glycerol successively with two mols of propionic acid and one mol of acetic acid, in which esterification product glycerol dipropionate monoacetate predominates.

6. A composition of matter comprising cellulose acetate and glycerol dipropionate as a plasticizer therefor.

7. A composition of matter comprising cellulose acetate and glycerol dipropionate monoacetate as a plasticizer therefor.

8. A composition of matter comprising 100 parts of a cellulose organic acid ester and, as a plasticizer therefor, from 10 to 75 parts, approximately, of a compound selected from the group consisting of glycerol dipropionate and glycerol dipropionate monoacetate.

9. A transparent, flexible sheet of a cellulose organic acid ester comprising 100 parts of the cellulose organic acid ester and, as a plasticizer therefor, from 10 to 75 parts, approximately, of a compound selected from the group consisting of glycerol dipropionate and glycerol dipropionate monoacetate.

10. A molding composition adapted for molding under elevated temperatures and high pressures, comprising a cellulose organic acid ester and, as a plasticizer therefor, a compound selected from the group consisting of glycerol dipropionate and glycerol dipropionate monoacetate.

DAVID C. HULL.